(12) United States Patent
Kong et al.

(10) Patent No.: US 12,763,463 B2
(45) Date of Patent: Oct. 13, 2026

(54) BEAMFORMING APPARATUS AND BEAMFORMING METHOD USING EXPANDABLE PLANAR ARRAY ANTENNA

(71) Applicant: ELECTRONICS AND TELECOMMUNICATIONS RESEARCH INSTITUTE, Daejeon (KR)

(72) Inventors: Sunwoo Kong, Daejeon (KR); Bong Hyuk Park, Daejeon (KR); Seung Hun Wang, Daejeon (KR); Hui Dong Lee, Daejeon (KR); Seunghyun Jang, Daejeon (KR); Seok Bong Hyun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 270 days.

(21) Appl. No.: 18/501,418

(22) Filed: Nov. 3, 2023

(65) Prior Publication Data

US 2024/0222862 A1 Jul. 4, 2024

(30) Foreign Application Priority Data

Dec. 29, 2022 (KR) ........................ 10-2022-0188783

(51) Int. Cl.

*H01Q 3/36* (2006.01)
*H01Q 1/48* (2006.01)
*H01Q 9/04* (2006.01)

(52) U.S. Cl.

CPC ................. *H01Q 3/36* (2013.01); *H01Q 1/48* (2013.01); *H01Q 9/0407* (2013.01)

(58) Field of Classification Search

CPC ........... H01Q 3/36; H01Q 1/48; H01Q 9/0407
See application file for complete search history.

(56) References Cited

U.S. PATENT DOCUMENTS 7,099,686 B2 8/2006 Ro et al.
9,520,655 B2 12/2016 Cerreno
(Continued)

FOREIGN PATENT DOCUMENTS

EP 3010086 B1 11/2017
KR 10-2008-0092218 A 10/2008
(Continued)

OTHER PUBLICATIONS

English Translation of KR20170028598A from Google Patents (Year: 2015).*

(Continued)

*Primary Examiner* — Bernarr E Gregory
*Assistant Examiner* — Isabella A Edrada
(74) *Attorney, Agent, or Firm* — LRK PATENT LAW FIRM

(57) ABSTRACT

A beamforming apparatus and a beamforming method using an expandable planar array antenna are provided. The beamforming apparatus that performs the beamforming method includes an array antenna in which an Elevation (EL) antenna group configured to perform beam steering in an elevation angle direction and an Azimuth (AZ) antenna group configured to perform beam steering in an azimuth angle direction are disposed on a same plane, a first chip located on a top surface of the array antenna and configured to control the beam steering in the elevation angle direction by controlling patch antennas included in the EL antenna group, and a second chip located on a bottom surface of the array antenna and configured to control the beam steering in (Continued)

100 the azimuth angle direction by controlling patch antennas included in the AZ antenna group.

8 Claims, 8 Drawing Sheets

(56) References Cited

U.S. PATENT DOCUMENTS

| | | | | |
|---|---|---|---|---|
| 10,056,700 | B2 | 8/2018 | Kim et al. | |
| 10,446,938 | B1 * | 10/2019 | Wang | H01Q 9/0407 |
| 10,680,553 | B2 | 6/2020 | Tousi et al. | |
| 2019/0379427 | A1 * | 12/2019 | Geekie | H01Q 21/065 |
| 2020/0358182 | A1 * | 11/2020 | Klemmer | H01Q 3/26 |
| 2021/0296764 | A1 * | 9/2021 | Shams | G01S 13/931 |
| 2022/0302603 | A1 * | 9/2022 | Chieh | H01Q 21/0075 |

FOREIGN PATENT DOCUMENTS

| | | | | | |
|---|---|---|---|---|---|
| KR | 10-2017-0028598 | A | | 3/2017 | |
| KR | 20170028598 | A | * | 3/2017 | H01Q 1/46 |
| KR | 10-1943769 | B1 | | 4/2019 | |
| KR | 10-2354167 | B1 | | 1/2022 | |
| KR | 10-2022-0118278 | A | | 8/2022 | |
| KR | 20220118278 | A | * | 8/2022 | H01Q 21/062 |

OTHER PUBLICATIONS

English Translation of KR20220118278A from Google Patents (Year: 2021).*

* cited by examiner

BEAMFORMING APPARATUS AND BEAMFORMING METHOD USING EXPANDABLE PLANAR ARRAY ANTENNA

CROSS-REFERENCE TO RELATED APPLICATION

This application claims the benefit of Korean Patent Application No. 10-2022-0188783 filed on Dec. 29, 2022, in the Korean Intellectual Property Office, the entire disclosure of which is incorporated herein by reference for all purposes.

BACKGROUND

1. Field of the Invention

One or more embodiments relate to a method of configuring an expandable planar array antenna that operates in a high-frequency band such as terahertz (THz) and a beamforming apparatus that generates a beam using the array antenna.

2. Description of Related Art

A two-dimensional (2D) planar array antenna includes an array of patch antennas disposed on a plane, and beamforming of the entire array antenna is adjusted by adjusting a phase between the disposed patch antennas. For the beamforming, an interval between the patch antennas is set to $\lambda/2$, and the interval narrows when the frequency of the transmission/reception signal increases and widens when the frequency of the transmission/reception signal decreases.

For example, if the frequencies of the transmission/reception signals are 30 gigahertz (GHz), 150 GHz, and 300 GHz, the intervals between the patch antennas are respectively 5 mm, 1 mm, and 0.5 mm, and thus, a four-channel CMOS chip has a size of about 3×3 mm.

When the frequency of the transmission/reception signal is low, the patch antenna and a chip for adjusting a beam in a 2D direction may be configured in a manner that the patch antenna is radially connected from each corner of the square chip using a four-channel chip.

When 30 GHz is targeted as the frequency of the transmission/reception signal, the chip may be mounted between 4 patch antennas disposed in a 2×2 arrangement. However, when a high frequency that operates in terahertz (THz) such as 150 GHz, 300 GHz, or the like is targeted as the frequency of the transmission/reception signal, there may be an issue of no physical space to dispose the chip between the patch antennas.

SUMMARY

Embodiments provide a method and an apparatus for implementing a beamforming apparatus in a small area even when the frequency of a transmission/reception signal is high by disposing a chip for adjusting a beam in a two-dimensional (2D) direction in a stacked manner on the top and bottom surfaces of an array antenna including a plurality of patch antennas.

However, technical aspects are not limited to the foregoing aspect and there may be other technical aspects.

According to an aspect, there is provided a beamforming apparatus that may perform a beamforming method including an array antenna in which an elevation (EL) antenna group configured to perform beam steering in an elevation angle direction and an azimuth (AZ) antenna group configured to perform beam steering in an azimuth angle direction are disposed on a same plane, a first chip located on a top surface of the array antenna and configured to control the beam steering in the elevation angle direction by controlling patch antennas included in the EL antenna group, and a second chip located on a bottom surface of the array antenna and configured to control the beam steering in the azimuth angle direction by controlling patch antennas included in the AZ antenna group.

The EL antenna group and the AZ antenna group may each include at least one patch antenna per channel connected according to a series-fed method, wherein two feed lines for the series-fed method may be disposed perpendicular to each other.

The array antenna may be connected to the first chip through a feed line that is disposed on a same plane as a plane on which the patch antennas included in the EL antenna group are disposed and that is directly connected to each of the patch antennas.

The array antenna may be connected to the second chip through a feed line disposed on a plane opposite to a plane on which the patch antennas included in the AZ antenna group are disposed and indirectly connected to each of the patch antennas.

The array antenna may include an aperture formed inside the array antenna for an indirect connection between the patch antennas included in the AZ antenna group and the feed line.

Each of unit antennas of the EL antenna group included in the array antenna may include a first substrate in which the patch antennas and a feed line configured to provide power to the patch antennas are disposed on a same plane, a second substrate disposed under the first substrate, and a ground (GND) layer disposed between the first substrate and the second substrate.

Each of unit antennas of the AZ antenna group included in the array antenna may include a first substrate in which the patch antennas are disposed, a second substrate disposed under the first substrate, in which a feed line configured to provide power to the patch antenna of the first substrate is disposed, and a ground (GND) layer disposed between the first substrate and the second substrate, wherein the GND layer may include an aperture formed inside the GND layer to indirectly provide power to the patch antenna of the first substrate through a feed line disposed in the second substrate.

The first chip and the second chip may each include at least one of a transmission amplifier, a reception amplifier, a switch configured to select the transmission amplifier or the reception amplifier, a phase shifter (PS), and a power combiner, wherein the first chip and the second chip may control the beam steering in the elevation angle direction and the azimuth angle direction by sequentially increasing or decreasing a delay phase value of the PS for each channel.

According to an aspect, there is provided a beamforming method performed by a beamforming apparatus including setting, in an array antenna in which an EL antenna group configured to perform beam steering in an elevation angle direction and an AZ antenna group configured to perform beam steering in an azimuth angle direction are disposed on a same plane, the EL antenna group to a transmission (or reception) operation, setting, in the array antenna, the AZ antenna group to a reception (or transmission) operation, obtaining a mutual coupling component between the EL antenna group and the AZ antenna group based on the set operation, and forming a beam pattern such that the obtained mutual coupling component is removed.

The EL antenna group and the AZ antenna group may each include at least one patch antenna per channel connected according to a series-fed method, wherein two feed lines for the series-fed method may be disposed perpendicular to each other.

The array antenna may be connected to the first chip through a feed line that is disposed on a same plane as a plane on which the patch antennas included in the EL antenna group are disposed and that is directly connected to each of the patch antennas.

The array antenna may be connected to the second chip through a feed line disposed on a plane opposite to a plane on which the patch antennas included in the AZ antenna group are disposed and indirectly connected to each of the patch antennas.

The array antenna may include an aperture formed inside the array antenna for an indirect connection between the patch antennas included in the AZ antenna group and the feed line.

The array antenna may further include a first chip located on a top surface of the array antenna and configured to control the beam steering in the elevation angle direction by controlling patch antennas included in the EL antenna group and a second chip located on a bottom surface of the array antenna and configured to control the beam steering in the azimuth angle direction by controlling patch antennas included in the AZ antenna group.

Each of unit antennas of the EL antenna group included in the array antenna may include a first substrate in which the patch antennas and a feed line configured to provide power to the patch antennas are disposed on a same plane, a second substrate disposed under the first substrate, and a ground (GND) layer disposed between the first substrate and the second substrate.

Each of unit antennas of the AZ antenna group included in the array antenna may include a first substrate in which the patch antennas are disposed, a second substrate disposed under the first substrate, in which a feed line configured to provide power to the patch antenna of the first substrate is disposed, and a ground (GND) layer disposed between the first substrate and the second substrate, wherein the GND layer may include an aperture formed inside the GND layer to indirectly provide power to the patch antenna of the first substrate through a feed line disposed in the second substrate.

The first chip and the second chip may each include at least one of a transmission amplifier, a reception amplifier, a switch configured to select the transmission amplifier or the reception amplifier, a PS, and a power combiner, wherein the first chip and the second chip may control the beam steering in the elevation angle direction and the azimuth angle direction by sequentially increasing or decreasing a delay phase value of the PS for each channel.

Additional aspects of embodiments will be set forth in part in the description which follows and, in part, will be apparent from the description, or may be learned by practice of the disclosure.

According to an embodiment, a beamforming apparatus may be implemented in a small area even when the frequency of a transmission/reception signal is high by disposing a chip for adjusting a beam in a 2D direction in a stacked manner on the top and bottom surfaces of an array antenna including a plurality of patch antennas.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
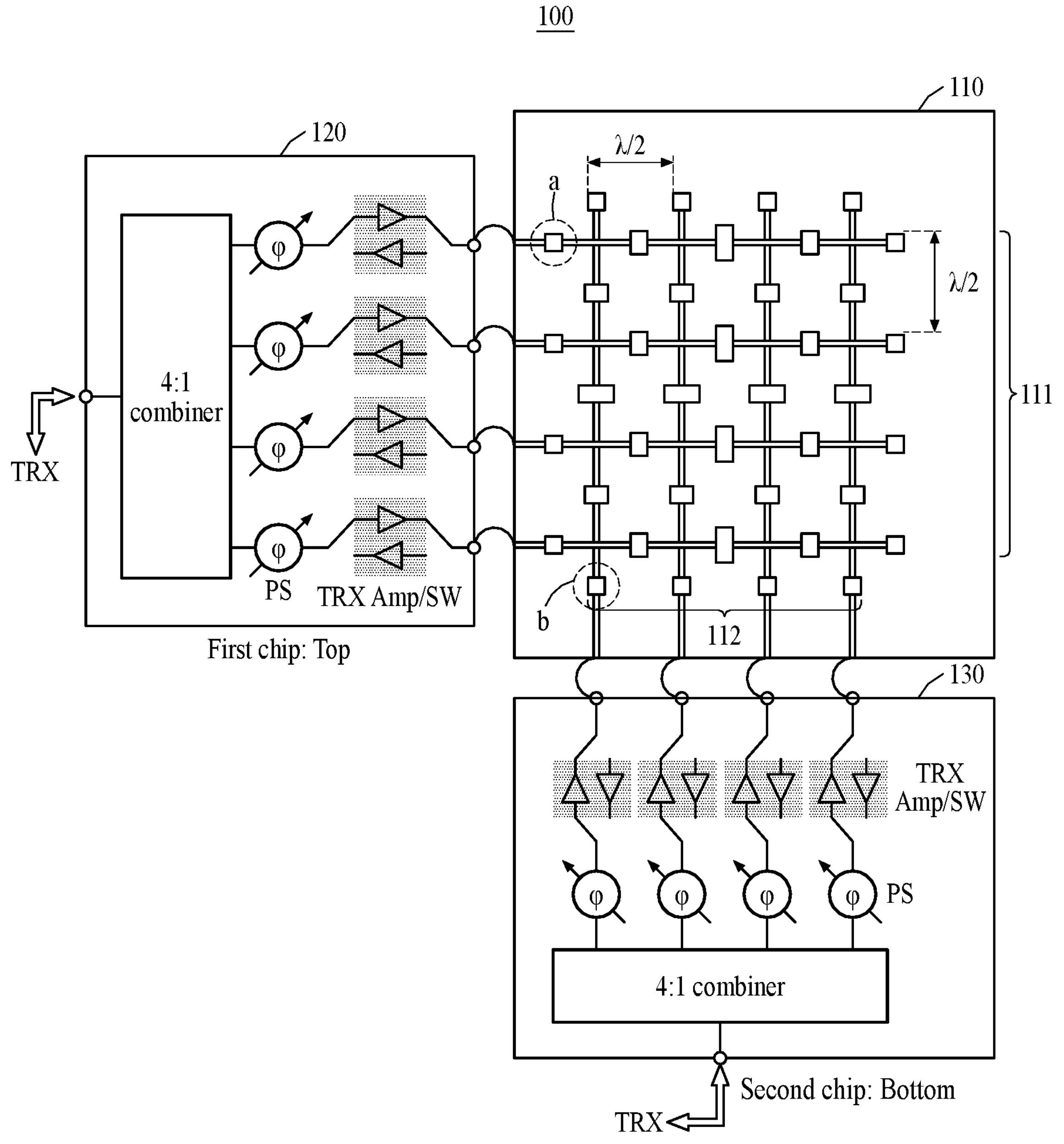
FIG. 1 is a diagram illustrating a beamforming apparatus implemented as an expandable planar array antenna according to an embodiment.

The following detailed structural or functional description is provided as an example only and various alterations and modifications may be made to embodiments. Thus, an actual form of implementation is not construed as limited to the embodiments described herein and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if one component is described as being "connected," "coupled," or "joined" to another component, the first component may be directly connected, coupled, or joined to the second component, or a third component may be "connected," "coupled," or "joined" between the first and second components.

The singular forms "a," "an," and "the" are intended to include the plural forms as well, unless the context clearly indicates otherwise. As used herein, each of phrases such as "A or B," "at least one of A and B," "at least one of A or B," "A, B, or C," "at least one of A, B, and C," and "at least one of A, B, or C" may include any one of the items listed in the corresponding one of the phrases or all possible combinations thereof. It will be further understood that the terms "comprises/comprising" and/or "includes/including" used herein specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which the present disclosure pertains. Terms such as those defined in commonly used dictionaries are to be interpreted as having a meaning that is consistent with their meaning in the context of the relevant art and are not to be interpreted in an idealized or overly formal sense unless expressly so defined herein.

Hereinafter, the embodiments are described in detail with reference to the accompanying drawings. When describing the embodiments with reference to the accompanying drawings, like reference numerals refer to like components and a repeated description related thereto is omitted.

FIG. 1 is a diagram illustrating a beamforming apparatus implemented as an expandable planar array antenna according to an embodiment.

Referring to FIG. 1, a beamforming apparatus 100 may include an array antenna in which an elevation (EL) antenna group 111 that may perform beam steering in an elevation angle direction and an azimuth (AZ) antenna group 112 that may perform beam steering in an azimuth angle direction are disposed on a same plane, a first chip 120 that may be located on the top surface of the array antenna 110 and may control the beam steering in the elevation angle direction by controlling patch antennas included in the EL antenna group 111, and a second chip 130 that may be located on the bottom surface of the array antenna 110 and may control the beam steering in the azimuth angle direction by controlling patch antennas included in the AZ antenna group 111.

First, in the array antenna 110, the EL antenna group 111 that may perform beam steering in the elevation angle direction and the AZ antenna group 112 that may perform beam steering in the azimuth angle direction may be disposed on a same plane.

Although FIG. 1 shows a configuration in which the EL antenna group 111 and the AZ antenna group 112 each include four-channel patch antennas, this is only an example and the number of channels may increase or decrease.

Here, the EL antenna group 111 and the AZ antenna group 112 may be positioned to have minimum signal coupling between the two groups of antennas. More specifically, signal coupling between the EL antenna group 111 and the AZ antenna group 112 may occur only in a small area in which feed lines intersect. Therefore, the patch antennas of the EL antenna group 111 and the patch antennas of the AZ antenna group 112 may be positioned such that only edges of the patch antennas are adjacent to each other and surfaces of the patch antennas are not adjacent to each other. Here, the area of the patch antennas connected to each channel of the EL antenna group 111 and the AZ antenna group 112 may decrease from the center to the edge to reduce a side lobe and thus improve the shape of a main beam. However, the area of the patch antennas is only an example and is not limited to the above example. In addition, the interval between the patch antennas connected to the each channel of the EL antenna group 111 and the AZ antenna group 112 may be determined to be A/2 based on the frequency of a transmission/reception signal.

The EL antenna group 111 and the AZ antenna group 112 may each include at least one patch antenna per channel connected according to a series-fed method. Here, a feed line of the EL antenna group 111 and a feed line of the AZ antenna group 112 for the serial-fed method may be disposed perpendicular to each other.

Here, the array antenna 110 may be connected to the first chip 120 through the feed line disposed on a same plane as a plane on which the patch antennas included in the EL antenna group 111 are disposed and directly connected to each of the patch antennas.

In contrast, the array antenna 110 may be connected to the second chip 130 through the feed line disposed on a plane opposite to a plane on which the patch antennas included in the AZ antenna group 112 are disposed and indirectly connected to each of the patch antennas. Here, the array antenna 110 may be connected to the second chip 130 through an aperture formed inside the array antenna 110 for an indirect connection between the patch antennas included in the AZ antenna group 112 and the feed line, using an aperture-coupled method.

In addition, the first chip 120 and the second chip 130 may each include a transmission amplifier (TX amp), a reception amplifier (RX amp), a switch for selecting the TX amp or the RX amp, a phase shifter (PS), and a power combiner. However, a frequency conversion function through a frequency mixer may be added to the first chip 120 and the second chip 130 according to the configuration of a transceiver. Here, the first chip 120 and the second chip 130 may control the beam steering in the elevation angle direction and the azimuth angle direction by sequentially increasing or decreasing the delay phase value of the PS for each channel.

Figure 2A:
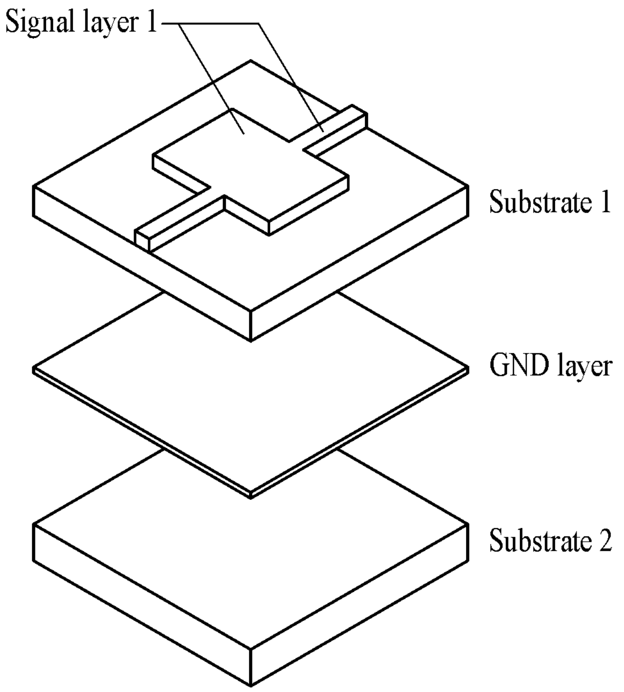
FIGS. 2A and 2B are diagrams each illustrating a structure of a patch antenna included in an array antenna according to an embodiment.
Figure 2B:
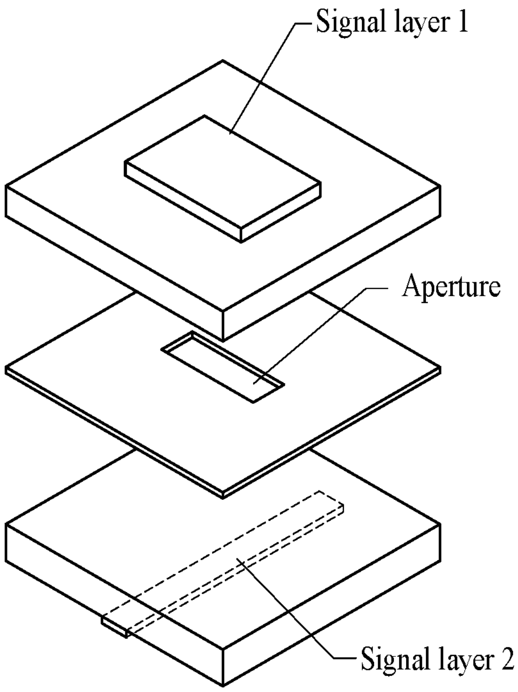

FIGS. 2A and 2B are diagrams each illustrating a structure of a patch antenna included in an array antenna according to an embodiment.

FIG. 2A illustrates a structure of a first unit antenna included in an EL antenna group included in the array antenna. The first unit antenna may include a first substrate (Substrate 1) and a second substrate (Substrate 2) disposed below the first substrate, and the first and second substrates may be separated from each other by a ground (GND) layer disposed between the first and second substrates.

More specifically, the first unit antenna may include the patch antenna and a feed line providing power to the patch antenna, both of which disposed on a same plane of a top surface of the first substrate. Here, the patch antenna and the feed line may correspond to a first signal layer (Signal layer 1).

FIG. 2B illustrates a structure of a second unit antenna included in an AZ antenna group included in the array antenna. The second unit antenna may also include a first substrate and a second substrate disposed below the first substrate, and the first and second substrates may be separated from each other by a GND layer disposed between the first and second substrates.

More specifically, the second unit antenna may include a patch antenna disposed on a top surface of the first substrate and a feed line that is disposed on a bottom surface of the second substrate and that provides power to the patch antenna. Here, the patch antenna may correspond to the first signal layer and the feed line may correspond to a second signal layer (Signal layer 2).

Here, an aperture may be formed inside the GND layer to indirectly provide power to the patch antenna disposed on the top surface of the first substrate through the feed line disposed on the bottom surface of the second substrate.

Figure 3:
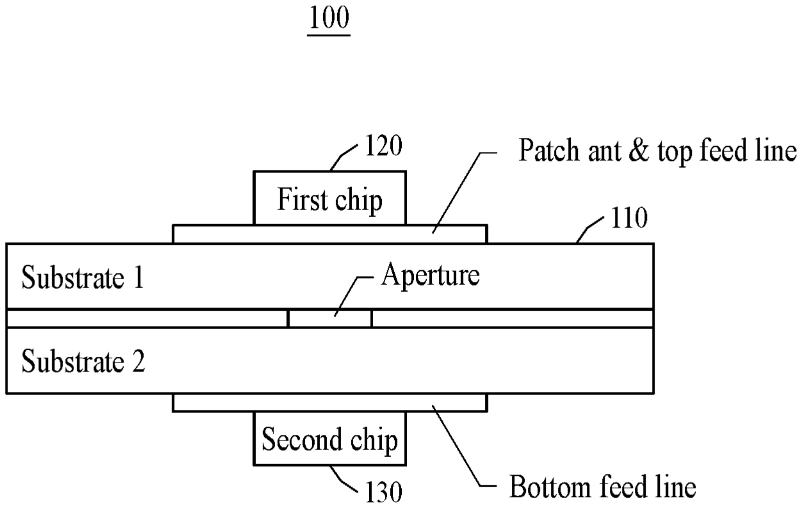
FIG. 3 is a cross-sectional view of a beamforming apparatus according to an embodiment.

FIG. 3 is a cross-sectional view of a beamforming apparatus according to an embodiment.

Referring to FIG. 3, the first chip 120 may be located on the top surface of the array antenna 110 and may be directly connected to patch antennas of an EL antenna group through a feed line. The second chip 130 may be located on the bottom surface of the array antenna 110, and patch antennas of an AZ antenna group and a feed line may be indirectly connected in an aperture-coupled method. A GND layer may be located between the first substrate and the second substrate to form an aperture.

Figure 4:
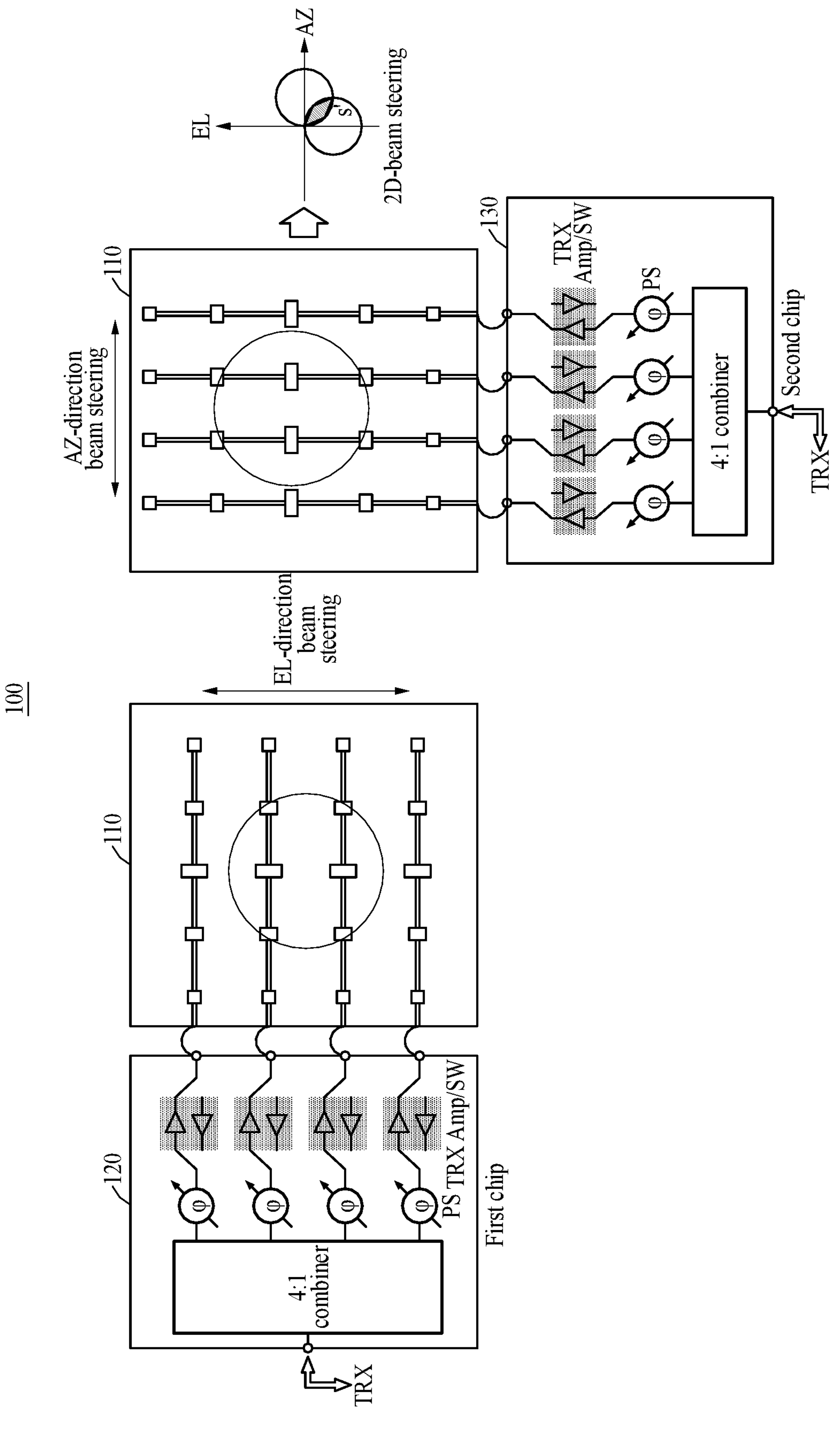
FIG. 4 is a diagram illustrating an operation of a beam steering apparatus according to an embodiment.

FIG. 4 is a diagram illustrating an operation of a beam steering apparatus according to an embodiment.

First, a beam steering apparatus 100 may control the patch antennas of the EL antenna group of the array antenna 110 by sequentially increasing or decreasing the delay phase value of the PS included in the first chip 120 for each channel, thereby controlling beam steering in an elevation angle direction.

In addition, the beam steering apparatus 100 may control the patch antennas of the AZ antenna group of the array antenna 110 by sequentially increasing or decreasing the delay phase value of the PS included in the second chip 130 for each channel, thereby controlling the beam steering in an azimuth angle direction.

The beam steering apparatus 100 may perform the controlling of the beam steering in the elevation angle direction and the beam steering in the azimuth angle direction either simultaneously in parallel or sequentially by dividing on a time axis.

Here, as shown in FIG. 4, the beam steering apparatus 100 may control the direction of a synthesized beam S' (hatched area) such as a vector sum from an intersection of a beam in the elevation angle direction and a beam in the azimuth direction, in a two-dimensional (2D) direction. Since a beam pattern generated by simultaneous feeding of the EL antenna group and the AZ antenna group may change, the range of the beam pattern of simultaneous feeding may be wider than a range of beam steering that may be configured by a simple intersection.

Figure 5:
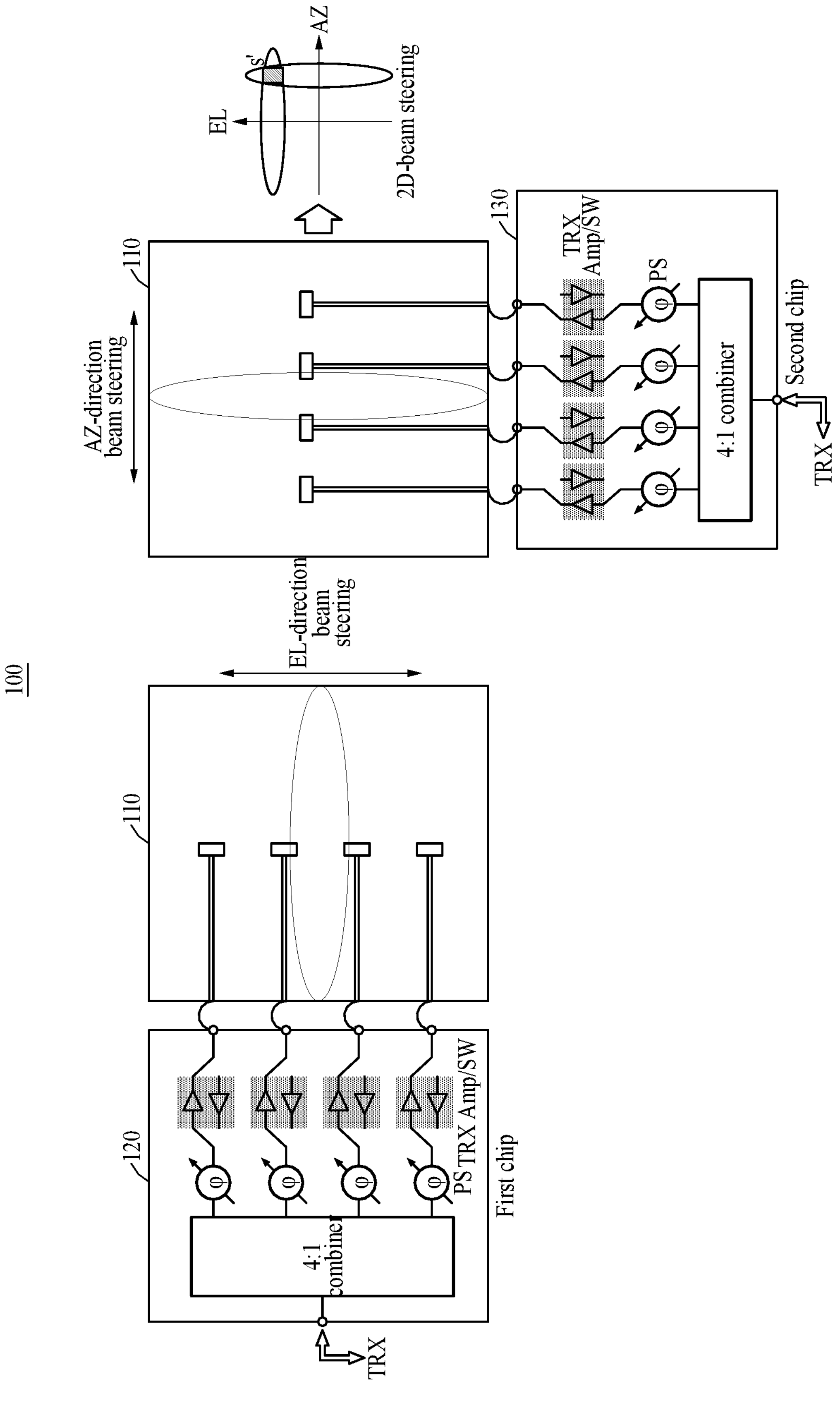
FIG. 5 is a diagram illustrating an operation of a beam steering apparatus when each channel of an elevation (EL) antenna group and an azimuth (AZ) antenna group has one patch antenna, according to an embodiment.

FIG. 5 is a diagram illustrating an operation of a beam steering apparatus when each channel of an EL antenna group and an AZ antenna group has one patch antenna, according to an embodiment.

If the number of patch antennas for each of the channels of the EL antenna group and the AZ antenna group included in the array antenna 110 is reduced, the gain of the array antenna 110 may be reduced but a range in which the intersection point of the beam in the EL direction and the AZ direction may be moved may increase, which may be advantageous in that a range of scanning may be widened.

As shown in FIG. 5, when the number of the patch antennas for each of the channels of the EL antenna group and the AZ antenna group included in the array antenna 110 is 1, the patch antennas included in the EL antenna group and the patch antennas included in the AZ group may each configure a fan beam and perform beam steering to a position in which the configured fan beams intersect.

Figure 6:
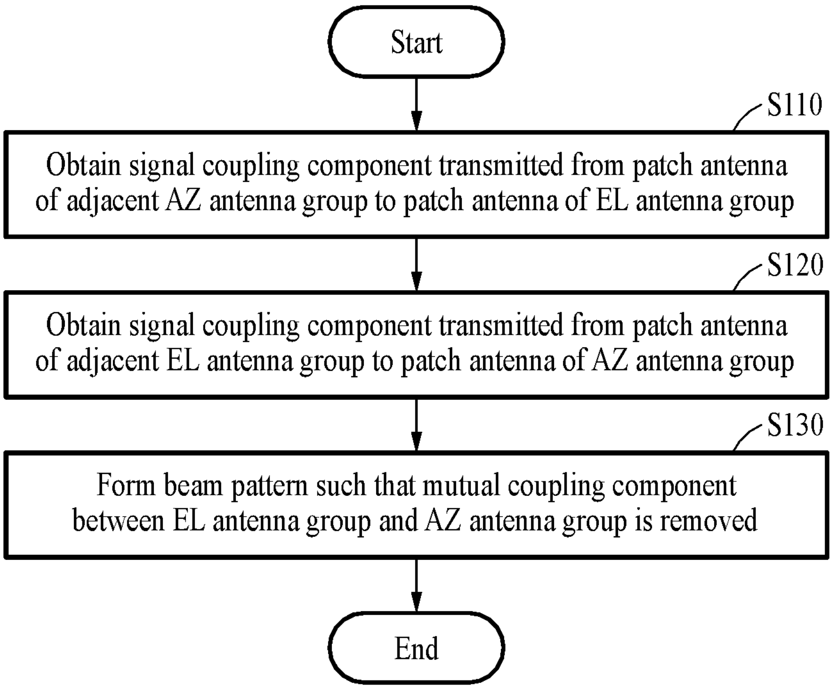
FIG. 6 is a diagram illustrating a method of removing a signal coupling phenomenon between an EL antenna group and an AZ antenna group, according to an embodiment.

FIG. 6 is a diagram illustrating a method of removing a signal coupling phenomenon between an EL antenna group and an AZ antenna group, according to an embodiment.

The beamforming apparatus 100 may include an array antenna in which the EL antenna group that may perform beam steering in an elevation angle direction and the AZ antenna group that may perform beam steering in an azimuth angle direction are disposed on a same plane and operate simultaneously.

In operation S110, the beamforming apparatus 100 may set the second chip 130 connected to the AZ antenna group to transmission and set the first chip 120 connected to the EL antenna group to reception, in order to perform calibration to remove an influence of the AZ antenna group during an operation of the EL antenna group, and may obtain a signal coupling component transmitted from a patch antenna of an adjacent AZ antenna group to a patch antenna of the EL antenna group. Here, the reception and transmission settings may be reversed.

In operation S120, the beamforming apparatus 100 may set the first chip 120 connected to the EL antenna group to transmission and set the second chip 130 connected to the AZ antenna group to reception, in order to perform calibration to remove an influence of the EL antenna group during an operation of the AZ antenna group, and may obtain a signal coupling component transmitted from the patch antenna of an adjacent EL antenna group to the patch antenna of the AZ antenna group. Similarly, the reception and transmission settings may be reversed.

In operation S130, the beamforming apparatus 100 may form a beam pattern such that an obtained mutual coupling component between the EL antenna group and the AZ antenna group is removed.

Figure 7:
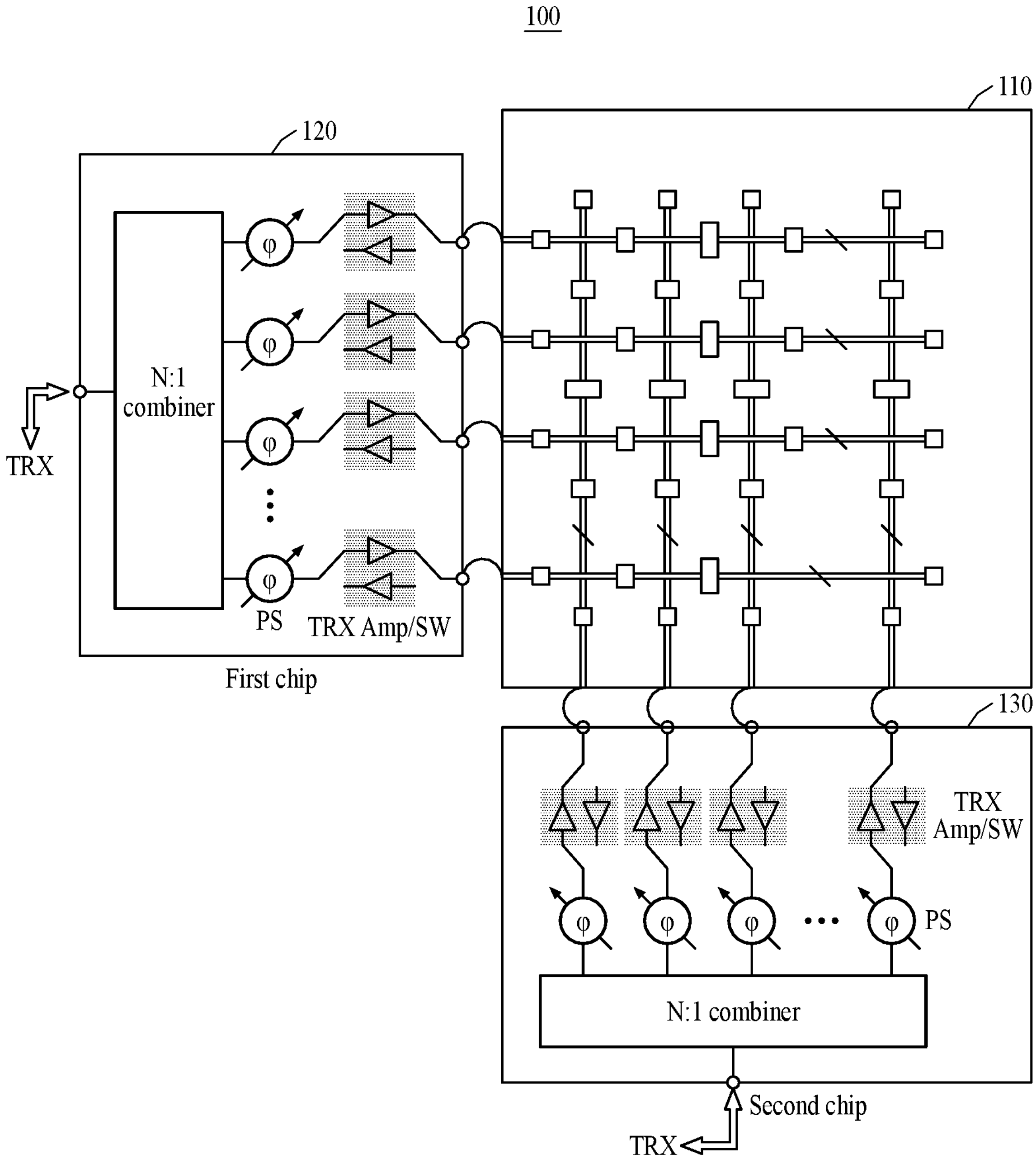
FIG. 7 is a diagram illustrating a first method of increasing a channel of an array antenna, according to an embodiment.

FIG. 7 is a diagram illustrating a first method of increasing a channel of an array antenna, according to an embodiment.

As shown in FIG. 7, the beamforming apparatus 100 may increase channels of the array antenna 110 by increasing the sizes of the first chip 120 connected to the EL antenna group and the second chip 130 connected to the AZ antenna group.

The above method has an advantage of arranging channels that may allow beam steering through precise phase control and configuring a power combiner within a chip but has a disadvantage that economic efficiency decreases as the size of the chip increases and the maximum number of channels is limited by a production process.

Figure 8:
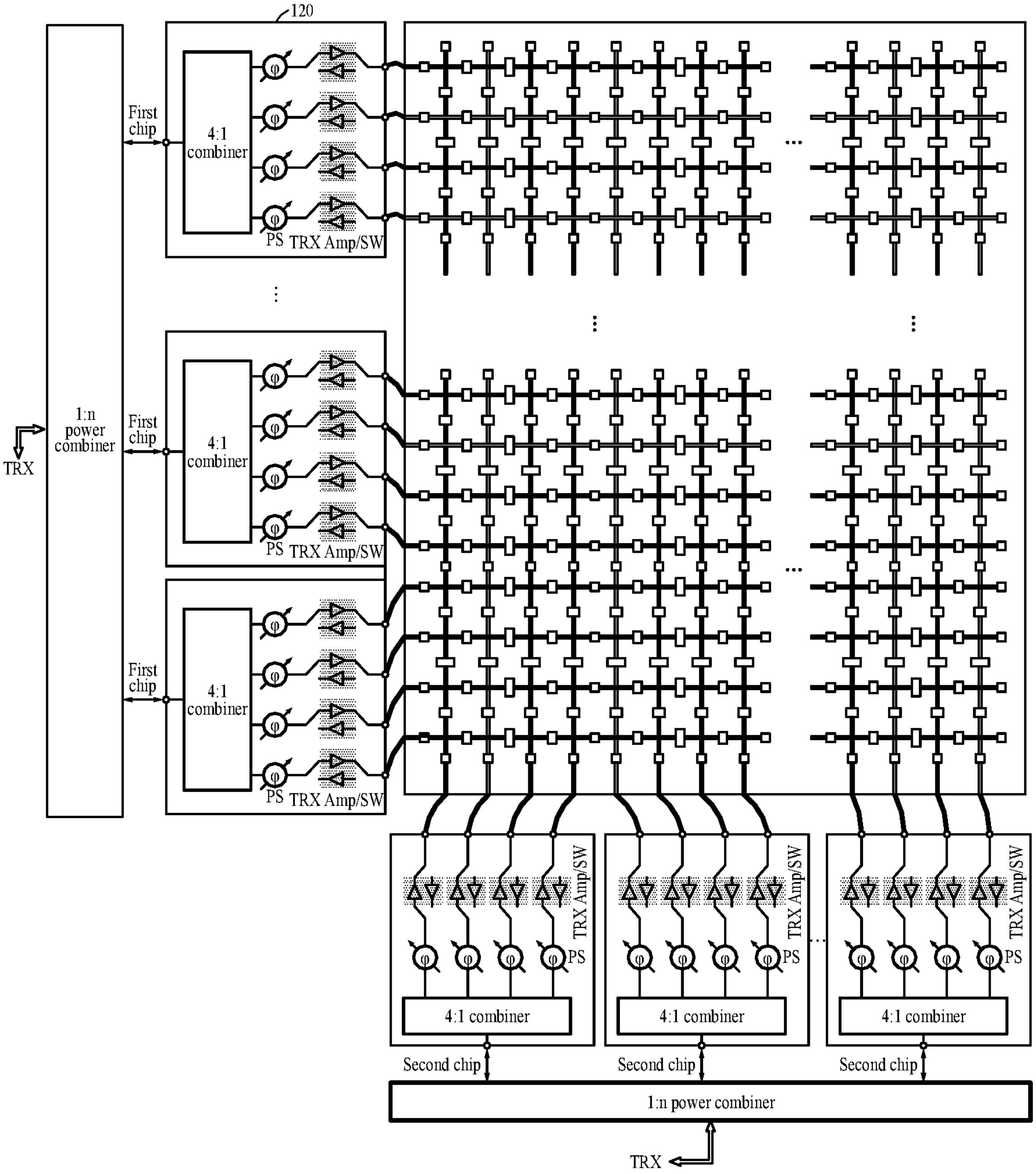
FIG. 8 is a diagram illustrating a second method of increasing a channel of an array antenna, according to an embodiment.

FIG. 8 is a diagram illustrating a second method of increasing a channel of an array antenna, according to an embodiment.

As shown in FIG. 8, the beamforming apparatus 100 may increase the number of channels of the array antenna 110 by arranging a plurality of the first chips 120 and the second chips 130 that have a determined number of channels.

The above method is economical compared to the method of FIG. 7 since there is no limitation on increasing the number of channels and the size of the chip may be reduced but has a disadvantage that an additional power combiner is needed outside the chip and that the arrangement of each chip may deteriorate the performance of precise phase control.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The embodiments described herein may be implemented using a hardware component, a software component, and/or a combination thereof. For example, a processing device may be implemented using one or more general-purpose or special-purpose computers, such as, for example, a processor, a controller, an arithmetic logic unit (ALU), a DSP, a microcomputer, an FPGA, a programmable logic unit (PLU), a microprocessor, or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is singular; however, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or one or more combinations thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored in a non-transitory computer-readable recording medium.

The methods according to the embodiments may be recorded in non-transitory computer-readable media including program instructions to implement various operations of the embodiments. The media may also include the program instructions, data files, data structures, and the like alone or in combination. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

The above-described hardware devices may be configured to act as one or more software modules in order to perform the operations of the above-described embodiments, or vice versa.

Although the embodiments have been described with reference to the limited drawings, one of ordinary skill in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and equivalents to the claims are also within the scope of the following claims.

What is claimed is:

1. A beamforming apparatus configured to perform a beamforming method, the beamforming apparatus comprising:

an array antenna in which an Elevation (EL) antenna group configured to perform beam steering in an elevation angle direction and an Azimuth (AZ) antenna group configured to perform beam steering in an azimuth angle direction are disposed on a same plane;

a first chip located on a top surface of the array antenna and configured to independently control the beam steering in the elevation angle direction by controlling EL patch antennas included in the EL antenna group, the first chip being directly connected to the EL patch antennas through a first feed line disposed on a same plane as the EL patch antennas; and a second chip located on a bottom surface of the array antenna and configured to independently control the beam steering in the azimuth angle direction by controlling AZ patch antennas included in the AZ antenna group, the second chip being indirectly connected to the AZ patch antennas through a second feed line disposed on a plane opposite to a plane on which the AZ patch antennas are disposed, wherein the indirect connection between the second chip and the AZ patch antennas is made through an aperture formed between the AZ patch antennas and the second feed line to indirectly provide power to the AZ patch antennas, wherein each of unit antennas of the EL antenna group included in the array antenna comprises:

a first substrate in which a corresponding one of the EL patch antennas and the first feed line configured to provide power to the corresponding one of the EL patch antennas are disposed on a same plane;

a second substrate disposed under the first substrate; and a ground (GND) layer disposed between the first substrate and the second substrate, wherein each of unit antennas of the AZ antenna group included in the array antenna comprises:

a first substrate in which a corresponding one of the AZ patch antennas is disposed;

a second substrate disposed under the first substrate, in which the second feed line configured to provide power to the corresponding one of the AZ patch antennas of the first substrate is disposed; and a ground (GND) layer disposed between the first substrate and the second substrate, wherein the GND layer comprises:

the aperture formed inside the GND layer to indirectly provide power to the corresponding one of the AZ patch antennas of the first substrate through the second feed line disposed in the second substrate.

2. The beamforming apparatus of claim 1, wherein the EL antenna group and the AZ antenna group each comprise:

at least one patch antenna per channel connected according to a series-fed method, wherein the first and second feed lines for the series-fed method are disposed perpendicular to each other.

3. The beamforming apparatus of claim 2, wherein the array antenna comprises:

the aperture formed inside the array antenna for the indirect connection between the AZ patch antennas and the second feed line.

4. The beamforming apparatus of claim 1, wherein the first chip and the second chip each comprise:

at least one of a transmission amplifier, a reception amplifier, a switch configured to select the transmission amplifier or the reception amplifier, a phase shifter (PS), and a power combiner, wherein the first chip and the second chip are configured to control the beam steering in the elevation angle direction and the azimuth angle direction by sequentially increasing or decreasing a delay phase value of the PS for each channel.

5. A beamforming method performed by a beamforming apparatus, the beamforming method comprising:

in an array antenna in which an Elevation (EL) antenna group configured to perform beam steering in an elevation angle direction and an Azimuth (AZ) antenna group configured to perform beam steering in an azimuth angle direction are disposed on a same plane, setting the EL antenna group to a transmission (or reception) operation by a first chip located on a top surface of the array antenna and configured to independently control the beam steering in the elevation angle direction by controlling EL patch antennas included in the EL antenna group, the first chip being directly connected to the EL patch antennas through a first feed line disposed on a same plane as the EL patch antennas;

setting the AZ antenna group to a reception (or transmission) operation by a second chip located on a bottom surface of the array antenna and configured to independently control the beam steering in the azimuth angle direction by controlling AZ patch antennas included in the AZ antenna group, the second chip being indirectly connected to the AZ patch antennas through a second feed line disposed on a plane opposite to a plane on which the AZ patch antennas are disposed, wherein the indirect connection between the second chip and the AZ patch antennas is made through an aperture formed between the AZ patch antennas and the second feed line to indirectly provide power to the AZ patch antennas;

obtaining a mutual coupling component between the EL antenna group and the AZ antenna group based on the set operation; and forming beam patterns for the EL antenna group and the AZ antenna group based on the independent control such that the obtained mutual coupling component is removed, wherein each of unit antennas of the EL antenna group included in the array antenna comprises:

a first substrate in which a corresponding one of the EL patch antennas and the first feed line configured to provide power to the corresponding one of the EL patch antennas are disposed on a same plane;

a second substrate disposed under the first substrate; and a ground (GND) layer disposed between the first substrate and the second substrate, wherein each of unit antennas of the AZ antenna group included in the array antenna comprises:

a first substrate in which a corresponding one of the AZ patch antennas is disposed;

a second substrate disposed under the first substrate, in which the second feed line configured to provide power to the corresponding one of the AZ patch antennas of the first substrate is disposed; and a ground (GND) layer disposed between the first substrate and the second substrate, wherein the GND layer comprises:

the aperture formed inside the GND layer to indirectly provide power to the corresponding one of the AZ patch antennas of the first substrate through the second feed line disposed in the second substrate.

6. The beamforming method of claim 5, wherein the EL antenna group and the AZ antenna group each comprise:

at least one patch antenna per channel connected according to a series-fed method, wherein the first and second feed lines for the series-fed method are disposed perpendicular to each other.

7. The beamforming method of claim 6, wherein the array antenna comprises:

the aperture formed inside the array antenna for the indirect connection between the AZ patch antennas and the second feed line.

8. The beamforming method of claim 5, wherein the first chip and the second chip each comprise:

at least one of a transmission amplifier, a reception amplifier, a switch configured to select the transmission amplifier or the reception amplifier, a phase shifter (PS), and a power combiner, wherein the first chip and the second chip are configured to control the beam steering in the elevation angle direction and the azimuth angle direction by sequentially increasing or decreasing a delay phase value of the PS for each channel.

* * * * *